United States Patent [19]

Rostrup-Nielsen

[11] E Re. 28,655

[45] Reissued Dec. 16, 1975

[54] PROCESS FOR THE PRODUCTION OF A REFORMING CATALYST

[75] Inventor: Jens Richard Rostrup-Nielsen, Virum, Denmark

[73] Assignee: Haldor Topsoe A/S, Soborg, Denmark

[22] Filed: May 8, 1974

[21] Appl. No.: 468,163

Related U.S. Patent Documents

Reissue of:

[64] Patent No.: 3,791,993
Issued: Feb. 12, 1974
Appl. No.: 81,534
Filed: Oct. 16, 1970

U.S. Applications:

[63] Continuation of Ser. No. 734,232, June 4, 1968, abandoned.

[30] Foreign Application Priority Data

June 12, 1967 United Kingdom ..... 27066/67

[52] U.S. Cl. ..... 252/466 J; 423/654
[51] Int. Cl. ..... B01j 11/22
[58] Field of Search ..... 252/466 J; 423/654

[56] References Cited

UNITED STATES PATENTS

| | | | |
|---|---|---|---|
| 2,038,566 | 4/1936 | Huettner | 252/466 J |
| 2,269,508 | 1/1942 | Barton | 423/600 |
| 3,368,982 | 2/1968 | Milbourne | 252/466 J |
| 3,436,358 | 4/1969 | Thygesen | 252/466 J |
| 3,451,949 | 6/1969 | Topsoe | 252/466 J |
| 3,515,527 | 6/1970 | Cockerham et al. | 252/473 X |

FOREIGN PATENTS OR APPLICATIONS

| | | | |
|---|---|---|---|
| 1,066,456 | 4/1967 | United Kingdom | 252/466 J |

*Primary Examiner*—Winston A. Douglas
*Assistant Examiner*—W. J. Shine
*Attorney, Agent, or Firm*—Eyre, Mann & Lucas

[57] ABSTRACT

There is provided a process for preparing a catalyst for reforming, particularly steam reforming of hydrocarbons. The process consists fundamentally in mixing intimately a solution of sodium or potassium aluminate, possibly containing excess of base (preferably sodium or potassium hydroxide, respectively) with either a solution of a nickel salt and a magnesium salt, or a solution of a nickel salt containing finely dispersed therein reactive magnesium oxide. The mixing results in coprecipitation of a fine sludge containing intimately mixed aluminum hydroxide, nickel hydroxide and either magnesium hydroxide (if a magnesium salt is used) or magnesium oxide. The sludge also contains a sodium or potassium salt which is removed by washing. The washed sludge is dried and dehydrated at 300–750° C., whereby an intimate mixture of oxides of magnesium, aluminium and nickel is formed. This mixture is pelletted in conventional manner and the pellets or bodies calcined at a temperature of 850–1100° C. The calcination involves conversion of alumina and part of the magnesia into spinel, whereas remaining magnesia during reforming acts as "promoter," i.a. to counteract carbon deposition. The precursor thus obtained contains NiO and can be reduced, preferably by hydrogen, and is thereafter suitable as catalyst containing elemental Ni for reforming reactions.

8 Claims, No Drawings

PROCESS FOR THE PRODUCTION OF A REFORMING CATALYST

Matter enclosed in heavy brackets [ ] appears in the original patent but forms no part of this reissue specification; matter printed in italics indicates the additions made by reissue.

This application is a continuation of application Ser. No. 734,232, filed June 4, 1968, now abandoned.

It is known to prepare reforming catalysts containing compounds of nickel, magnesium and aluminium, cf. for instance the specification to British Pat. No. 1,058,757.

The present invention relates to a process for the preparation by co-precipitation of a catalyst for reforming gaseous or vaporizable liquid hydrocarbons with steam, carbon oxide (particularly carbon dioxide), oxygen and/or air, said catalyst containing nickel, iron or cobalt or oxides reducible to these. In the present specification, the catalyst in unreduced form, i.e. containing nickel, iron or cobalt oxide will also be termed a precursor. For use as catalyst during the reforming process, the oxide is totally or partially reduced to the free metal, which particularly constitutes the catalytically active principle in such processes. The reduction, which in literature is often referred to as the activation of the catalyst, most frequently takes place by treatment with hydrogen or hydrogen-evolving substances, and is normally caused in the reactor in which the catalyst is employed during the reforming process.

Catalyst of the said main type are suitable for hydrocarbon reactions, for instance for hydrogenation, and especially are suitable for reforming processes in which the gaseous or vaporized hydrocarbons are cracked, most frequently by the aid of steam. According to the reaction conditions employed, such as pressure, temperature, space velocity and the ratio O:C, particularly the ratio between moles of $H_2O$ and atoms of C, in the reaction mixture conducted into the reactor, there is obtained a product gas which is rich in hydrogen, for instance for the production of pure hydrogen or synthesis gas, or which has a more or less high content of methane and is suitable for instance as town gas or substitute for natural gas. As starting material one most frequently employs petroleum fractions such as light distillates, benzines, naphthas, natural gas or liquefied petroleum gases such as propane or butanes, or mixtures containing these. The reforming always is carried out at elevated temperature and nowadays often at elevated pressure.

The catalytically active metal is usually nickel, and the invention will hereinafter be explained with specific regard to this metal, but iron and cobalt can be used with similar results.

Many nickel catalysts for the reforming processes are known. Most of them are supported on more or less porous bodies or particles of refractive material in order to ensure a satisfactorily large catalytically active nickel surface. The supported catalysts can be divided in two main groups, the "impregnated" ones and the "co-precipitated" ones. The impregnated catalysts consist of a porous support material, usually of refractive oxides, on which nickel and possibly co-catalysts or promoters are impregnated. The co-precipitated catalysts are formed by more or less simultaneous precipitation in one vessel of the various materials which in conjunction constitute the support material, including a possible binding agent, and the catalytically active material. The support materials usually contain one or more of the elements Al, I, Ca, Mg, Cr, and Zr, sometimes entirely or partially present as oxides, sometimes as more complicated compounds. The binding and support materials of the support or carrier in other cases may consist of naturally occurring refractory materials. In all events, the properties of the carrier or support with regard to in particular refractoriness and mechanical strength have great importance for reforming catalysts, especially because the trend in reforming technology is to increase the pressure and in some cases also the temperature in the reforming reactor as much as possible, which raises heavy demands to the stability and the strength of the catalyst.

One impregnated reforming catalyst is known from British patent specification No. 1,058,757. The support of that catalyst entirely or in a substantial degree consists of magnesium-aluminium spinel, $MgAl_2O_4$, a compound which imparts a considerable strength to the catalyst in its entirety. This catalyst is suitable for some reforming reactions, but not without reservations for reforming "difficult" hydrocarbons, particularly not for reforming hydrocarbon mixtures containing higher paraffins, comparatively large amounts of olefins or aromatics or other difficult hydrocarbons, since these difficult hydrocarbons have a tendency to deposit carbon on the catalyst. This leads to a decrease of the catalytical activity and also can lead to the breaking down of the catalyst. This difficulty can be overcome by promoting the nickel catalyst, which is best done with an alkali metal oxide, and preferably with potassium oxide. The promoter compound should preferably be present in the catalyst in a certain proportion to nickel, and the catalyst should preferably be substantially free from silicon, as explained in the British patent specification No. 1,058,758.

Such a catalyst is very suitable for reforming even the "difficult" hydrocarbon mixtures and under exacting conditions, i.e. high temperature and high pressure, for instance approaching 50 atmospheres, and with a comparatively low steam to carbon ratio in the feed mixture of steam and hydrocarbons. However, the alkali promoting involves a disadvantage. The hydrocarbon mixtures subjected to reforming processes always contain a certain amount of sulphur, and even if they are desulphurized before being conducted to the reforming reactor, it is impossible or altogether uneconomical to remove all traces of sulphur. The catalyst therefore inevitably sooner or later will become sulphur-poisoned. The unpromoted catalyst can easily be regenerated with steam, but it is rather difficult to remove sulphur, which will be present in combined form, from the sulphur-poisoned catalyst when it has been promoted with alkali metals, particularly potassium or sodium.

It is an object of the invention to provide a process for the preparation of a catalyst which on one side is physically and chemically sturdy, and on the other side has and retains for a long time a high activity, even when used for reforming difficult hydrocarbon mixtures, i.e. hydrocarbon mixtures containing higher paraffins (especially paraffins above $C_3$), olefins, aromatics and other hydrocarbons causing difficulties during the reforming, especially by causing the deposition of carbon on the catalyst. Particularly it is the object of the invention to provide a process for preparing such catalysts which can be employed under exacting working conditions, such as high pressure, high temperature and low steam to carbon ratio in the reaction mixture to reform.

This is obtained by the process of the invention, which is characterized in that one mixes a solution of a nickel, iron or cobalt salt, said solution also containing a dissolved magnesium salt and/or finely divided, finely dispersed, reactive magnesium oxide, with a solution containing sodium aluminate or potassium aluminate and, if necessary, excess of base, to co-precipitate a finel sludge of magnesium hydroxide and/or magnesium oxide in intimate mixture with nickel, iron or cobalt hydroxide and aluminium hydroxide, whereupon the sludge is washed substantially free from sodium and potassium in any form and dried and dehydrated (dewatered) at a temperature of 300–750° C. to form an intimate mixture of oxides of magnesium and aluminium and nickel, iron or cobalt, after which this oxide mixture is worked up into bodies of desired size and shape and these bodies are calcined at a temperature of 850–1100° C., after which the nickel, iron or cobalt oxide is reduced, if desired. If the nickel, iron or cobalt oxide is not reduced, the catalyst will be obtained as the precursor, whereas the reduction, which will most frequently be carried out with hydrogen, leads to the formation of the finished catalyst with nickel, iron or cobalt at least partially present in elementary form.

The catalyst thus formed belongs to the co-precipitated type. The precursor comprises two solid phases, formed by the calcination, and interlacing one another intimately in a finely pored structure. The phases are on the first hand a phase of magnesium aluminium spinel imparting to the catalyst the desired mechanical sturdiness and strength, and on the other hand a solid mixed phase of reactive magnesium oxide and nickel oxide. The finished catalyst, i.e. after the reduction has taken place, contains three phases also interlacing one another in the finely pored structure, namely in the first place the same phase of magnesium aluminium spinel, an the second hand a phase of reactive magnesium oxide and in the third place a phase of metallic nickel. The spinel phase may possibly contain nickel.

It is thereby obtained that the catalytically active metal in the finished catalyst is situated intimately "interlaced" in a forcefully alkaline environment of the reactive magnesium oxide, which efficiently counteracts the deposition of carbon on the catalyst, even when the latter is used for reforming difficult hydrocarbon mixtures and under severe or exacting reaction conditions. Furthermore, the catalyst has a high strength because of the content of of spinel. The intimate mutual position or interlacing of the two or three phases of the precursor or catalyst, respectively, is due to the co-precipitation technique, by which there is first formed the intimate mixture of the hydroxides (in which mixture magnesium hydroxide may be entirely or partially replaced by reactive magnesium oxide), and this mixture subsequently by the dehydration is converted into a likewise intimate mixture of the oxides in finely divided state.

It is particularly convenient to carry out the mixing of the two solutions by conducting them simultaneously into a vessel at substantially the same equivalent rate; the precipitation thereby becomes differential, i.e. it occurs both from the alkaline and the acidic side of the iso-electric point. Hereby one ensures a very uniform distribution and intermixing of the hydroxides in the sludge and later of the oxides in the dried and dehydrated oxide mixture and in the bodies formed.

By "reactive" or "active" magnesium oxide is meant in the present specification a magnesium oxide having suitably high chemical and physical reactivity. There is no clear, unique, fundamental difference between reactive and inactive magnesium oxide, but a gradual transition. The reactivity of magnesium oxide will normally be a function of the heat treatment to which magnesium oxide or some other magnesium compound, for instance magnesium hydroxide or carbonate, has been subjected during the production of magnesium oxide preparation. Generally, a higher treatment temperature will give less physical and chemical activity than a lower treatment temperature, the higher treatment temperature leading to larger particles with a crystal structure approaching the ideal one in a higher degree than that obtained by a lower treatment temperature, and also the higher treatment temperature leads to particles therefore having a smaller surface area than magnesium oxide particles obtained by a lower treatment temperature. Reactive magnesium oxide preparations are often termed "light calcined magnesium oxide (magnesite)." The reactive magnesium oxide preparations have normally a low powder bulk density, but not any such preparation having low powder bulk density is reactive, because a magnesium oxide fired at a high temperature may have a low bulk density, for instance because it has been ground.

It is therefore chosen in the present specification to define the reactivity of the magnesium oxide on the basis of the so-called iodine number (Ind. and Eng. Chemistry, 1947, vol. 39, 69 pp.), which indicates how much iodine there can be adsorbed by a magnesium oxide preparation from a solution of iodine in carbon tetrachloride. This measurement is empirical, but there is generally some relation between the iodine number and the powder bulk density. In the present specification, by reactive magnesium oxide is generally meant magnesium oxide having an iodine number (expressed in milliequivalents iodine per 100 mg. MgO) above about 10. Example 6 hereinafter illustrates the significance of the iodine number for the catalyst prepared by the process according to the invention, and also illustrates the powder bulk density of the magnesium oxide preparations shown in the example. It should be mentioned that preparation No. 1 of MgO shown in the table in Example 6 rapidly could be hydrated into $Mg(OH)_2$ at room temperature, whereas preparation No. 6 was hydrated very slowly at room temperature. The rate of hydration may possibly be significant during the described preparation of the catalyst.

It has been found that the catalyst is not satisfactory if the calcination takes place at higher temperatures than 1100° C. as mentioned hereinbefore, which is due to the fact that the magnesium oxide therein then sinters and furthermore becomes reactive in a too small degree. The inactivation of the magnesium oxide is due to the fact that the particles therein sinter together, whereby there is also caused a decrease of the surface area.

Several coprecipitated nickel catalysts for reforming reactions are known, as well as processes for their preparation. From British patent specification No. 1,071,510 a process is known for the production of such a coprecipitated, nickeliferous reforming catalyst, in which a mixture of nickel oxide and magnesium oxide is shaped and calcined at a temperature of more than 1200° C. into a form in which all or the major portion of the nickel oxide is combined as mixed crystals of nickel oxide and magnesium oxide. This high calcination temperature, however, leads to a considerable inactivation of the oxide, which is disadvantageous in various respects. The precursor directly formed by the calcination and containing mixed crystals of MgO and NiO is more easy to reduce into the active catalyst when the calcination temperature is lower—at the most 1100° C.—than when it is above this temperature. Also, the reactive magnesium oxide in the catalyst calcined at a temperature below 1100° C. is more efficient in inhibiting carbon formation during the reforming processes than the magnesium oxide obtained by a higher temperature and therefore inactivated in a higher degree.

A particular advantage is gained during the reforming processes when using a catalyst containing reactive magnesium oxide, in practice magnesium oxide which has not been subjected to a temperature higher than about 1100° C. During the reforming processes, there takes place a certain sintering of the catalytically active particles of metallic nickel, whereby the catalytically active nickel area decreases and the activity of the catalyst consequently decreases. When the catalyst contains reactive magnesium oxide, it is, however, easier to re-establish the mixed phase of MgO and NiO than in cases where the magnesium oxide has been inactivated, because by oxidation it is possible to obtain the formation of a kind of solid solution of nickel oxide in the reactive magnesium oxide, thereby obtaining a decrease of the particle size of the nickel by the renewed reduction of the precursor thus re-established. This property of the catalyst prepared by the process of the invention is very important, because it allows a simple re-establishment of the activity of the catalyst when this activity has decreased to a value below the desired value.

According to the aforementioned British patent specification No. 1,071,510 it is possible during the production of the catalyst to add other substances such as activators, diluents and carriers. it is, i.a., possible to add hydrated alumina, whereby the catalyst will contain aluminium oxide as a kind of carrier. According to the present invention, the aluminium compound of the catalyst should be employed during its production in the form of a soluble aluminate, by which it is obtained that aluminium hydroxide (hydrated $Al_2O_3$) is precipitated simultaneously with $Ni(OH)_2$ and possibly $Mg(OH)_2$, the latter if there is employed a magnesium salt during the preparation. By this coprecipitation the formation of magnesium aluminium spinel. $MgAl_2O_4$, during calcination is facilitated, which is significant for the strength of the catalyst, especially because the maximum temperature employed, 1100° C., is lower than that ordinarily used for the preparation of artificial magnesium aluminium spinel.

Another coprecipitated nickel catalyst for reforming reactions is known from the British patent specification No. 267,535, which describes the coprecipitation of nickel, aluminium and magnesium compounds. This catalyst, however, also contains potassium oxide and therefore has the disadvantage of difficult regeneration after sulphur poisoning. It furthermore has the drawback of an extremely high nickel content, so that it is very expensive. Coprecipitated nickel-aluminium catalysts furthermore have the drawback that they usually cannot stand heating at high temperatures, for instance above 600–700° C., and therefore cannot be used at high reforming temperatures. From British patent specification No. 914,423 is known a catalyst consisting of nickel oxide-rich nickel spinel and 5–10% excess of nickel oxide; the high nickel content renders this catalyst very costly. A catalyst known from British patent specification No. 1,032,756 contains coprecipitated alumina and chromia and furthermore a hydraulic binding agent which, however, has been added after the coprecipitation. A catalyst known from British patent specification No. 1,055,909 is prepared from coprecipitated aluminium and nickel compounds which are calcined at relatively low temperature, up to about 500° C., and is devised for reforming temperatures of maximum about 500° C. This catalyst probably cannot stand much higher temperatures which is due to the fact that it has not the strength obtained according to the present invention on account of the presence of magnesium oxide and the consequent formation of spinel.

As mentioned, the precursor or catalyst prepared by the process according to the invention consists of two or three, respectively, intimately interlaced solid phases. These may be accompanied by smaller amounts of impurities originating from unconverted raw materials, for instance alumina or aluminates, or from small amounts of impurities therein, but the impurities will not disturb the fundamental structure. Yet it should be observed that it is important that alkali metal compounds and ions are substantially removed in the washing step, because otherwise there will arise the above-mentioned difficulties in regeneration after sulphur poisoning, which difficulties it is an important object of the invention to avoid.

The catalyst produced in the described manner has a high activity in reforming reactions, which especially is due to the large catalytically active nickel surface originating from the structure of the precursor. In this the nickel oxide is present in a mixed phase with the magnesium oxide and the mixture is virtually atomic. In the precursor the magnesium oxide/nickel oxide-mixed phase is distinct from the $MgAl_2O_4$-phase, because of the known fact that the magnesium oxide and the magnesium aluminium spinel are not miscible. When the nickel oxide is reduced into metallic nickel, the nickel micro particles are separated from one another by the magnesium oxide, and sintering of the nickel into larger crystals is thereby counteracted. The large nickel area causes a high catalytical activity and contributes to give the catalyst a long life, and to this also contributes the low tendency of the nickel micro particles to sinter together in this structure. The nickel is placed very intimately in an alkyaline environment of the magnesium oxide, and this alkaline environment has the same selective effect as a catalyst activator or promotor as has for instance potassium oxide when used as promotor in nickel catalysts. The catalyst produced by the process of the invention therefore has a high ability to resist or counteract carbon deposition reactions. even when treating "difficult" hydrocarbons or when working under exacting conditions such as high temperature, high pressure and a low ratio $H_2O$:C in the reaction mixture conducted into the reactor. Since alkali metal is not present, the catalyst may easily be regenerated after a possible sulphur poisoning. Although the magnesium oxide phase is distinct from the magnesium aluminium spinel phase, these two phases interlace intimately and the catalyst therefore has a great mechanical and physical strength. There is no risk of release of silicon, since no Si is present in the catalyst, or at the most insignificant amounts of Si if slightly impure, Si-containing raw materials have been used.

The catalyst may be produced with virtually any desired, high or low, relative content of nickel, only on the condition that sufficient room is available for the spinel phase to render the catalyst sufficiently strong. In certain known catalyst precursors the nickel is prior to reduction chemically combined with other elements, for instance chromium, and the formula of the nickel compound determines the nickel content of the precursor and thereby of the catalyst. Since contrariwise nickel oxide and magnesium oxide are completely miscible with each other in all proportions, one can use any proportion NiO:MgO, and it is therefore possible to give the catalyst a high, a medium or a low nickel content according to desire and to the intended use of the catalyst. According to the invention, the raw materials are preferably used in proportions so as to give the oxide mixture prior to calcination a content of 5–50% of nickel, oxide (or iron or cobalt oxide), 10–75% of magnesium oxide and 5–60% of alumina, all these percentages calculated on the total weight of the three said compounds.

The atomic ratio between Ni, Mg and Al may vary according to the intended use of the catalyst. In two separately preferred embodiments, the catalyst is prepared so as to obtain the atomic ratios Ni:Mg:Al of about 1:1:2 and aboout 2:7:1, respectively. A catalyst with the first mentioned of these atomic proportions is comparatively inexpensive and has a high activity, but owing to its comparatively low content of MgO is it not quite capable of preventing carbon deposition when reforming hydrocarbons or hydrocarbons mixtures having an outspoken tendency to such carbon depositions. It should therefore be used in reforming processes in which the risk of carbon deposition is low, for instanace when reforming natural gas. A catalyst having the second one of these atomic proportions, 2:7:1, is able to counteract the carbon forming reaction even in cases where the hydrocarbon feed stock is one having a high tendency to deposit carbon. Other proportions of the three elements could also advantageously be employed within as beyond the limits mentioned hereinbefore.

In order to have the catalytically active nickel surface available to the reacting gases, the catalyst bodies or particles must be porous. It has been found the most expedient if the pores are of two types, namely comparatively few comparatively wide pores having a radius of at least 1000 A., and a large number of narrow pores having a radius of at most 300 A. The narrow pores should constitute a substantial proportion of the total pore volume, preferably about 50% of this volume or more. The wider pores, which may have a radius much above the minimum value mentoined, for instances 4000 or even 10000 A., serve as passages or "main roads" to the interior of the catalyst, i.e. to the narrower pores, but do not contribute very much to the large surface area of the catalyst; this large surface area is substantially provided by the inner surfaces of the narrower pores. The narrower pores may be as narrow as having a radius of for instance 100 or even 50 A. The narrow pores, which are prevented from breaking down by the strong spinel lattice, do also contribute to prevent the nickel crystallites from fusing or sintering together or growing during or after the reduction of the nickel oxide, whereby the nickel crystallites in practice are almost excluded from obtaining a diameter larger than that of the narrower pores. A very advantageous pore size distribution is one in which the narrower pores constitute about 75% of the total pore volume. The narrow pores are generated by virtue of the fact that the catalyst is formed by the particles constituting the said fine sludge. The wider pores may be brought about in various manners, most expediently in connection with working up the dried and dehydrated mixture into shaped bodies. Even in this connection the comparatively low calcination temperature is advantageous, because it opens up the possibility of incorporating small cellulose fibres into the dried and dehydrated mixture for forming the wider pores. These fibres burn away during the calcination, leaving the said wider pores, but if the calcination takes place at too high temperature, above the said 1100° C., there will be a trend for these wider pores to break down, or there may occur crystal growth into these wider pores.

As solution of nickel salt and magnesium salt, which as mentioned may be replaced by a nickel salt solution containing finely dispersed reactive magnesium oxide, and as solution of sodium or potassium aluminate, it is preferred to use aqueous solutions, and when mixing the two solutions together they are preferably conducted from separate lines or vessels into a common precipitation vessel so that the precipitation becomes differential. In other words, the solutions are preferably added to one another with the same number of equivalents per unit of time, so that the acidic and the alkaline liquid are always present in equivalent amounts. The intermixing of the liquids is preferably brought about comparatively speedily, but when the precipitation is differential this will automatically ensure a small particle size of the sludge.

If instead of a magnesium salt one uses reactive magnesium oxide in the starting liquids, it is possible by a suitable selection of the degree of reactivity of the magnesium oxide to influence the strength of the final catalyst, by which for obtaining a catalyst having exceptional high strength one uses a particularly reactive magnesium oxide, i.e. magnesia having a high iodine number or a low bulk density.

During dehydration, the hydroxides in the sludge are converted into oxides, whereby is formed a solid mixed phase of magnesium oxide and nickel oxide, and a solid phase of alumina. During heating for calcination of the shaped bodies, the alumina reacts with part of the magnesium oxide in the mixed phase, so that $MgAl_2O_4$ is formed. This reaction takes place in the grain boundaries as a solid substance reaction, and therefore the magnesium-aluminium spinel will be extremely evenly distributed in the bodies which again impart the great mechanical strength to the precursor or the catalyst. Since the solid mixed phase of NiO and MgO is virtually an atomic mixture, there is no risk of MgO and NiO migrating from one another. When the spinel has been formed, migration is further excluded by the fact that MgO is not miscible with the spinel. The pore system will be automatically stabilized during the heating process. As mentioned, this pore system partly originates from the structure inherent in the powder formed by the dehydration, but may be developed further during the said grain boundary reactions.

As nickel salt one employs preferably the sulphate or nitrate, and especially the nitrate is preferred; if a magnesium salt is employed, this is also preferably the sulphate or the specially preferred nitrate. These compounds are relatively easily available and react quickly with the aluminate, and the reaction product on precipitation, sodium or potassium nitrate or sulphate, may be easily eliminated by the washing subsequent to precipitation. Sodium and potassium aluminate are strongly alkaline substances, so that the magnesium, aluminium and nickel are precipitated as hydroxides, but nevertheless an excess of base is preferably used in the aluminate solution, the base being present in an amount determined by the stoichiometrical proportions. The base is preferably the hydroxide of the same alkali metal as the aluminate, i.e. sodium or potassium hydroxide. By "excess" of base are meant such amounts of base which are not chemically combined in the aluminate. The precipitation as mentioned is differential, i.e. both from the acidic and alkaline side, which ensures a very intimate mixture of the hydroxide in the sludge, and of the hydroxides with magnesia when this is employed instead of magnesium salt. By normal coprecipitation from three salts, for instance nitrates, by the addition of sodium or potassium hydroxide, the hydroxides are not precipitated simultaneously; aluminium hydroxide is precipitated first and therefore one does not obtain the same intimate mixture of the hydroxides.

As mentioned, it is preferred in practice to conduct the two solutions from separate vessels to a third vessel equipped with a stirrer, in which third vessel the precipitation occurs. After the precipitation it is convenient to thicken the slude in a suitable apparatus in which also the washing can be carried out, especially to remove the sodium or potassium salt formed. The washing step may comprise a filtering in which the hydroxides are left as filter cake, and the potassium or sodium salt is removed substantially with the filtrate. The drying of the sludge can be carried out in any desired manner, for instance in a drying apparatus, and at any desired temperature not exceeding a temperature at which premature spinel formation is caused. The drying may be separate or continue directly in the dehydration which, as mentioned, is carried out at 300–750° C., preferably at 350–500° C. When the dehydration has been completed, the dried product may be granulated and the particulate material thus formed may be worked up into pellets or tablets of desired size and shape corresponding to the final size and shape of the precursor and catalyst. During this one can use conventional adjuvants such as lubricants, for instance graphite or stearates. The dehydrated mixture may sometimes contain small amounts of water, which may facilitate the tabletting procedure. Finally the calcination is carried out by heating to the temperature interval stated. Even if it is possible that spinel formation may conceivably commence below 850° C., there cannot be expected satisfactory results unless a calcination temperature between 850° and 1100° C. is obtained. It is particularly expedient to carry out calcination at a temperature of 950°–1050° C. because hereby on one side one ensures a satisfactory spinel formation when the starting material is the oxide mixture formed from the sludge, and on the other hand does not run any risk of deactivation or crystal growth of the magnesium oxide. After the dehydration, the sludge may also be directly worked up into pellets or tablets, or the granulate may be extruded and the extruded strands be cut up into suitable pellets.

The precursor thus formed after reduction into the catalyst is suitable for reforming, especially steam reforming of hydrocarbons in the gaseous phase. The reforming is carried out thereby that the hydrocarbon feed stock together with steam or another oxygen-containing gas, for instance carbon dioxide or air, is conducted over the particulate catalyst which is preferably placed as a bed in a suitable reactor. The reforming normally is carried out continuously. The reaction conditions with respect to pressure, temperature, steam to hydrocarbons ratio and space velocity may be the conditions usually employed in such processes; they depend i.a. on the desired composition of the product gas, because with an active catalyst as the present one, the reaction mixture will adjust itself to a certain thermodynamic reaction equilibrium which may be calculated on the basis of said parameters. The hydrocarbon mixtures employed will normally be such having a boiling point interval, the final boiling point of which is up to 350° C.

For preparing a town gas containing a considerable amount of methane, it is advantageous to carry out the reforming at an exit temperature in the catalyst bed of 350°–750° C., under a pressure of 5–75 atm. absolute and an atomic ratio O:C in the steam-hydrocarbon feed stock of 0.8–2.5.

Particularly expediently for the preparation of such town gas having a content of 25–40% of methane, calculated on the dried product gas, one can employ a pressure of 25–40 atm., a temperature in the exit layer of the catalyst bed of 650°–700° C. and a ratio O:C in the steam-hydrocarbon feed stock of 1.5–2.5. It has been found that the catalyst is stable and counteracts the deposition of carbon even with such low amount of steam at least when it is rich in magnesium oxide as previously discussed.

For preparing a synthesis gas rich in hydrogen, it is expedient to use a temperature in the exit layer of the catalyst of 600°–1000° C., a pressure in the range of 1–300 atm. absolute and an atomic ratio O:C in the steam-hydrocarbons feed stock of 1–10.

Since it is most important that the catalyst is highly efficient in the first part, i.e. the upper part of the catalyst bed, and since the risk of carbon deposition is also biggest in this upper or first part of the catalyst bed, it is possible to let the catalyst here described be present only in the first (upper) 40–60% of the catalyst bed, the remaining part of the catalyst bed being constituted of any other nickel catalyst.

The process according to the invention will be illustrated in the following by some examples. It should be understood that these examples should not be construed as limiting the scope of the invention.

EXAMPLE 1

(A) A precursor having the atomic proportion Ni:Mg:Al of 2:7:1 (in the following called catalyst II) was prepared in the following manner:

241.4 kg. of $Ni(NO_3)_2$, $6H_2O$ and 745.2 kg. of $Mg(NO_3)_2$, $6H_2O$ were dissolved in 1840 liters of desalted water. 155.5 kg. of $Al(NO_3)_3$, $9H_2O$ were dissolved in 975 liters of 27.7% sodium hydroxide, whereby a solution of sodium aluminate was formed. The two solutions were conducted to a precipitation vessel, whereby the precipitation was differential. The sludge precipitated was washed, concentrated and dried. After heat treatment at 400° C. the powder was granulated and pelleted into cylinders of 9 × 9 mm. The pellets were calcined at 1000° C. The precursor contained below 0.1% Na. Its density was 2.2 g./cm.$^3$, the breaking strength in the axial direction 1700 kg./cm$^2$, the pore volume about 0.24 ml./g. of precursor.

(B) 59 g. of the above precursor crushed to particles of 2–4 mm. were placed in a tubular reactor in laboratory scale and having an inner diameter of 20 mm. The reactor was placed in an electrically heated oven. The catalyst bed made up a volume of 45.5 ml. After reduction the catalyst was tested for the production of a town gas by steam reforming of a paraffinic naphtha having final boiling point at 110° C., the following process conditions being used:

Atomic ratio O:C in feed: 1.8
Pressure: 31 atm. gauge
Temperature in exit layer of catalyst: 680° C.
Space velocity: 4.3 vols. naphtha/vols. catalyst/hr.

During the experiment, which lasted 810 hours, the following composition of dry product gas was measured, figures being given in percent by volume:

| Hours after start | 18 | 281 | 522 | 752 |
|---|---|---|---|---|
| $H_2$ | 42.71 | 41.71 | 42.81 | 41.21 |
| CO | 6.15 | 5.77 | 5.99 | 5.82 |
| $CO_2$ | 15.82 | 16.81 | 16.97 | 16.94 |
| $CH_4$ | 35.31 | 35.70 | 34.22 | 36.02 |
| $C_2H_6$ | <0.01 | <0.01 | <0.01 | <0.01 |

After the experiment the catalyst was intact, and no carbon deposition could be observed. The experiment shows that the catalyst can reform naphtha into town gas without carbon deposition. The fact that there were no measurable amounts of hydrocarbons with two carbon atoms or more in the product gas shows that the catalyst has a high activity, which fact is further emphasized by the very constant composition of the product gas.

EXAMPLE 2

126 g. of the precursor II prepared according to Example 1(A) were placed in a reactor of the same kind as that described in Example 1(B). After reduction with hydrogen the catalyst was tested under critical conditions for the production of a gas rich in methane by steam reforming of a naphtha having final boiling point at 162° C. and a content of aromatics and naphthenes of 9% by weight and 21% by weight, respectively. The following reaction conditions were employed:

Atomic proportion O:C in the feed: 1.0
Pressure: 31 atm. gauge
Temperature in exit layer of catalyst: 500° C.
Space velocity: 1.33 vols. naphtha/vols. catalyst/hr.

During the experiment, which last 65 hours, the following composition of the dry product gas was measured (percent by volume):

| Hours after start | 4 | 28 | 64 |
|---|---|---|---|
| $H_2$ | 11.58 | 15.66 | 14.80 |
| CO | 0.45 | 0.49 | 0.43 |
| $CO_2$ | 20.93 | 20.83 | 21.35 |
| $CH_4$ | 67.03 | 62.99 | 63.59 |
| $C_2H_6$ | <0.01 | 0.03 | 0.03 |

After 65 hours a weak breakthrough of liquid hydrocarbons was observed. After the end of the experiment, the catalyst was intact and no carbon deposits had been formed. The experiment further shows the high activity of the catalyst, since in about 3 days while carrying out the reforming at a comparatively low temperature it has been able to resist hydrocarbon poisoning from a naphtha having high content of aromatics. During this experiment, a gas was produced which after removal of carbon dioxide will have approximately the same composition as natural gas.

EXAMPLE 3

This example is not according to the invention, but serves as a comparison.

(A) 200 g. of cylinders with dimensions 3 × 3 mm. of a catalyst support consisting of magnesium aluminium spinel, prepared as described in the British patent specification No. 1,058,757, were impregnated at 90° C. with a melt of 142 g. of $Ni(NO_3)_2$, $6H_2O$ and 500 g. of $Mg(NO_3)_2$, $6H_2O$, i.e. an atomic ratio Ni:Mg in the melt of 1:4. Subsequently, the impregnated bodies were subjected to calcination at 500° C. and thereafter the impregnation and calcination were repeated under the same conditions. Analysis of the thus formed unreduced catalyst showed 5.1% by weight of Ni and 11.9% by weight of acid-soluble MgO.

(B) 24.6 g. of this catalyst were placed as 3 × 3 mm. cylindrical tablets in the same reactor as that described in Example 1. The volume of the unreduced catalyst bed was 21 mls. After reduction the catalyst was tested for its ability to produce a gas by steam reforming of a paraffinic naphtha having final boiling point 110° C. under the following process conditions:

Atomic ratio O:C in feed: 1.8
Pressure: 31 atm. gauge
Temperature in exit layer of catalyst: 650° C.
Space velocity: 9 vols. naphtha/vols. catalyst/hr.

During the experiment, which lasted for 30 hours the following composition of the dry product gas was measured (percent by volume):

| Hours after start | 6 | 18 | 30 |
|---|---|---|---|
| $H_2$ | 37.27 | 37.55 | 39.74 |
| CO | 4.61 | 4.02 | 3.68 |
| $CO_2$ | 17.02 | 16.75 | 17.22 |
| $CH_4$ | 40.88 | 41.33 | 39.10 |
| $C_2H_6$ | 0.22 | 0.22 | 0.26 |
| $C_3H_8$ | 0.00 | 0.13 | 0.00 |

After the experiment the upper layer of the catalyst bed was crushed and large amounts of carbon depositions had been formed. The experiment shows the importance of the extremely intimate interlacing of the solid phases in the precursor, i.e. of preparing it from the two phases of oxides and of forming the spinel by reaction in the grain boundaries as described. The catalyst prepared from the spinel and the nickel and magnesium nitrates, as described in the present example, does not have the intimate mixture of nickel and magnesium ions as have the catalysts prepared from the oxide mixture obtained by the coprecipitation, and the magnesium oxide therefore has not been sufficiently active as a promoter.

EXAMPLE 4

(A) A catalyst precursor having the atomic ratio Ni:Mg:Al of 1:1:2 (in the following called precursor I) was prepared as follows:

322 g. (abt. 1.1 mols) $Ni(NO_3)_2$, $6H_2O$ were dissolved in 1 liter of water;

285 g. (1.11 mols) of $Mg(NO_3)_2$, $6H_2O$ were dissolved in 1 liter of water;

861 g. (2.3 mols) of $Al(NO_3)_3$, $9H_2O$ were dissolved in 1.5 liters of water;

425 g. of NaOH (10.6 mols) were dissolved in 2 liters of water.

The precipitation and working up of the precursor were carried out as described in Example 1(A). The finished precursor particles, cylinders of 9 × 9 mm., had a specific weight of 2.1 g./cm.$^3$ and a breaking strength in axial direction of 250 kg./cm.$^2$.

(B) 65 g. of this precursor were crushed down to 2–4 mm. particles and placed in a reactor as described in Example 1(B); the volume was 50 ml. After reduction with hydrogen, the catalyst was tested for the production of a town gas by steam reforming of a paraffinic naphtha having final boiling point 110° C. The same reaction conditions were employed as in Example 1(B), and the experiment was carried out for 300 hours. During this period the following composition of dry product gas was measured (percent by volume):

| Hours from start | 17 | 111 | 204 | 300 |
|---|---|---|---|---|
| $H_2$ | 42.34 | 44.53 | 44.39 | 46.95 |
| CO | 5.00 | 4.86 | 5.12 | 4.89 |
| $CO_2$ | 17.02 | 16.15 | 15.20 | 12.99 |
| $CH_4$ | 35.63 | 34.45 | 35.28 | 35.16 |
| $C_2H_6$ | <0.01 | <0.01 | <0.01 | <0.01 |

After the experiment the catalyst was partially crushed and considerable amounts of carbon deposition had been formed. The example shows that the Ni:Mg ratio is decisive for the desired promoter activity of MgO. The catalyst shows a very high activity of MgO. The catalyst shows a very high activity, since during the 300 hours of the experiment no measurable amount of hydrocarbons with two or more C-atoms were observed. In other words, this catalyst can be advantageously employed in cases where there is no risk of carbon deposition, for instance for reforming natural gas (for instance to produce synthesis gas rich in hydrogen) or various mixtures containing carbon monoxide.

EXAMPLE 5

(A) A catalyst (precursor) with the same composition as the catalyst (precursor) II was prepared as follows:

241 kg. of $Ni(NO_3)_2$, $6H_2O$ and 117 kg. of MgO were dissolved and suspended, respectively, in 1840 liters of desalted water. 53.4 kg. of sodium aluminate (containing 21 percent by weight of Al) were dissolved in 137 liters of 27.7% potassium hydroxide and 850 liters of desalted water. The solution and suspension were conducted to a common precipitation vessel, whereby the precipitation was differential, after which the further treatment was carried out as described in Example 1.

The finished catalyst was obtained as rings having an outer diameter of 13 mm., an inner diameter of 6 mm. and a height of 7 mm.

(B) In a tubular reactor in pilot scale 20.9 kg. of the above precursor were placed on the top of 10.0 kg. of a catalyst prepared by one impregnation of a support as described in Example 3(A) in a nickel nitrate melt with subsequent calcination. The catalyst layer totally made up 38 liters. The reactor, which had an inner diameter of 90 mm., was placed in an oven heated by oil-consuming burners.

After reduction the catalyst was tested for producing a gas rich in hydrogen by steam reforming of naphtha. The testing was carried out in two periods.

Period 1:

Duration: 650 hrs.
Final boiling point of naphtha: 110° C.
Atomic proportion O:C in feed: 6.5–7.5
Pressure: 31 atm. gauge
Temperature in exit layer of catalyst: 850° C.
Space velocity: 0.7 vols. naphtha/vols. catalyst.

During the experiment a composition of dry product gas was measured as shown in the table below.

Period 2, carried out with the same catalyst bed:

Duration: 580 hrs.
Final boiling point of naphtha: 170° C.
Contents of aromatics in naphtha: 6.5%
Atomic ratio O:C in feed: 4.5–4.8
Pressure: 26 atm. gauge
Temperature in exit layer of catalyst: 820° C.
Space velocity: 0.8 vols. naphtha/vols. catalyst/hr.

During the experiment a composition of dry product gas was measured as shown in the table below (percent by volume):

| | Period 1 | | Period 2 | |
|---|---|---|---|---|
| Hours after start | 36 | 643 | 671 | 1,211 |
| $H_2$ | 74.05 | 74.96 | 70.81 | 71.20 |
| CO | 8.97 | 8.67 | 11.59 | 11.64 |
| $CO_2$ | 16.35 | 15.96 | 15.14 | 14.88 |
| $CH_4$ | 0.62 | 0.40 | 2.45 | 2.27 |
| $C_2H_6$ | <0.01 | <0.01 | <0.01 | <0.01 |

After the experiment the catalyst was intact.

EXAMPLE 6

A series of preparations of catalyst II was prepared on laboratory scale in the manner described in Example 5, various types of magnesia being employed. The preparations were pelleted into 9 mm. cylinders having the same specific weight for all the types, and all the preparations were calcined at 1000° C. The various types of MgO employed are described in the table below by the iodine number and the powder bulk density. The iodine number indicates the amount of iodine adsorbed by the magnesia preparation from a solution in carbon tetrachloride under standard conditions and is a measurement of the reactivity of the preparation. The table also shows the breaking strength of the various catalysts prepared from the various types of magnesium oxide.

| MgO No. | Iodine number, milliequivalents per 100 g. MgO | Powder bulk density of MgO, g./ml. | Breaking strength of catalyst, kg./cm$^2$ | |
|---|---|---|---|---|
| 1 | 23 | 0.15 | 404 | Usable preparations. |
| 2 | 31 | 0.24 | 533 | do. |
| 3 | 54 | 0.15 | 1,289 | do. |
| 4 | 19 | 0.48 | 340 | do. |
| 5 | 18 | 0.11 | 405 | do. |
| 6 | 1.0 | 0.98 | 12 | Unusable preparations. |
| 7 | 1.3 | 1.50 | 12 | do. |

The table shows that magnesium oxide preparations having low iodine number and high bulk density give unusable catalysts.

What is claimed is:

1. The process for the preparation of a precursor for a catalyst for reforming hydrocarbons which comprises the steps of mixing an aqueous solution of a salt selected from the group consisting of soluble salts of nickel, iron and cobalt, said solution further containing a substance selected from the group consisting of soluble salts of magnesium and dispersed, finely divided, reactive magnesium oxide, with another solution containing a member selected from the group consisting of sodium aluminate and potassium aluminate, and also containing an excess of base not chemically combined in the aluminate, to simultaneously and differentially coprecipitate a fine sludge of intimately mixed fine particles of aluminum hydroxide, a hydroxide of an element selected from the group consisting of nickel, iron and cobalt, and a member of the group consisting of magnesium hydroxide and magnesium oxide, then washing said sludge substantially free from sodium and potassium in any form and thereafter drying and dehydrating said sludge at a temperature of 300–750° C. to form an intimate mixture of oxides of magnesium, aluminum and of an element selected from the group consisting of nickel, iron and cobalt, and then calcining said oxides mixture at a temperature of 850°–1100° C. and wherein the starting materials are used in proportions so as to give the oxides mixture prior to calcination a content of 5–50% of an oxide selected from the class consisting of nickel, iron and cobalt oxides, 10–75% of magnesium oxide and 5–60% of aluminum oxide the percentages being calculated on the total weight of the said compounds.

2. The process of claim 1, in which the excess base is composed of a hydroxide of the same alkali metal as that chemically combined in the aluminate.

3. The process of claim 1, in which the salts of nickel, iron and cobalt and magnesium employed are selected from the group consisting of nitrates and sulphates.

4. The process of claim 1, in which the dehydration is carried out at a temperature of 350°–500° C.

5. The process of claim 1, in which the starting materials used are in proportions so as to give the oxides prior to calcination a content of 33–35% of NiO, 17–21% of MgO and 45–50% of $Al_2O_3$, these percentages being calculated on the total weight of the said oxides.

6. The process of preparing a catalyst for reforming hydrocarbons wherein the precursor formed by the process of claim 1 is subjected to a reducing treatment to convert the oxide of the element selected from the group consisting of nickel, iron and cobalt, at least in part into the corresponding free metal.

7. An unreduced precursor for a catalyst for reforming hydrocarbons, said precursor being made by the process comprising the sequential steps of (1) preparing a first aqueous solution of a salt of a metal selected from the group consisting of nickel, iron and cobalt, said solution further containing a substance selected from the group consisting of soluble salts of magnesium and dispersed, finely divided, reactive magnesium oxide;

(2) preparing a second aqueous solution containing a member selected from the group consisting of sodium aluminate and potassium aluminate and also containing an excess of base not chemically combined in the aluminate;

(3) mixing said first aqueous solution with said second aqueous solution to cause simultaneous and differential coprecipitation of a fine sludge of intimately mixed fine particles of aluminum hydroxide, a hydroxide of an element selected from the group consisting of nickel, iron and cobalt, and a member of the group consisting of magnesium hydroxide and magnesium oxide;

(4) washing said sludge substantially free from sodium and potassium in any form:

(5) drying and dehydrating said sludge at a temperature of 300°–750° C. to form an intimate mixture of oxides of magnesium, aluminum and of an element selected from the group consisting of nickel, iron and cobalt;

(6) calcining said mixture at a temperature of 850°–1100° C.; and (7) wherein the starting materials are used in proportions so as to give the oxides mixture prior to calcination a content of 5–50% of an oxide selected from the class consisting of nickel, iron and cobalt oxides, 10–75% of magnesium oxide and 5–60% of aluminum oxide, the percentages being calculated on the total weight of the said compounds.

8. A catalyst prepared by reducing the precursor of claim 7 to an active metal reforming catalyst.

* * * * *